United States Patent
Zhang et al.

(10) Patent No.: US 10,303,743 B2
(45) Date of Patent: May 28, 2019

(54) AUTOMATIC PLACEMENT OF ELECTRONIC MEDIA CONTENT ITEMS WITHIN AN ONLINE DOCUMENT

(71) Applicant: Facebook, Inc., Menlo Park, CA (US)

(72) Inventors: Dan Zhang, Foster City, CA (US); Xiongjun Liang, Sunnyvale, CA (US); Chin Lung Fong, Foster City, CA (US); Maria Angelidou, Menlo Park, CA (US); Harshit Agarwal, Menlo Park, CA (US); Shiyang Liu, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 83 days.

(21) Appl. No.: 15/337,289

(22) Filed: Oct. 28, 2016

(65) Prior Publication Data
US 2018/0121392 A1 May 3, 2018

(51) Int. Cl.
| | | |
|---|---|---|
| *G06F 17/00* | (2019.01) | |
| *G06F 17/21* | (2006.01) | |
| *G06F 17/22* | (2006.01) | |
| *G06N 7/00* | (2006.01) | |
| *G06N 20/00* | (2019.01) | |
| *G06F 17/24* | (2006.01) | |

(52) U.S. Cl.
CPC ........ *G06F 17/211* (2013.01); *G06F 17/2205* (2013.01); *G06F 17/2247* (2013.01); *G06F 17/241* (2013.01); *G06N 7/005* (2013.01); *G06N 20/00* (2019.01)

(58) Field of Classification Search
CPC ..... G06F 17/24; G06F 17/212; G06F 3/04842
USPC ................................ 715/209, 243, 255, 200
See application file for complete search history.

(56) References Cited

U.S. PATENT DOCUMENTS

| | | | | |
|---|---|---|---|---|
| 6,816,847 | B1 * | 11/2004 | Toyama | G06K 9/00 382/156 |
| 7,593,868 | B2 * | 9/2009 | Margiloff | G06Q 30/02 705/14.25 |
| 9,070,141 | B2 | 6/2015 | Hua et al. | |
| 9,317,812 | B2 | 4/2016 | Kabiljo et al. | |
| 2003/0149938 | A1 * | 8/2003 | McElfresh | G06Q 30/02 715/251 |
| 2007/0185855 | A1 * | 8/2007 | Shah | G06F 17/30867 |
| 2008/0320512 | A1 * | 12/2008 | Knight | G06Q 30/02 725/32 |
| 2009/0125544 | A1 * | 5/2009 | Brindley | G06F 17/30038 |

(Continued)

*Primary Examiner* — Manglesh M Patel
(74) *Attorney, Agent, or Firm* — Fenwick & West LLP (57) ABSTRACT

An online system stores online documents, where each online document has a layout. The system creates augmented online documents by combining the online documents with one or more content items. The system stores client interactions with the content items, responsive to presenting the augmented online documents via a client device. The system receives a new online document. The system creates new augmented online documents by combining the new online document with one or more new content items. For each new augmented online document, the system generates a score based on one or more features describing the layout of the new augmented online document. The system selects a new augmented online document based on the generated scores and sends the selected new augmented online document for presentation via a client device.

19 Claims, 8 Drawing Sheets

(56) References Cited

U.S. PATENT DOCUMENTS

| | | | |
|---|---|---|---|
| 2009/0292608 A1* | 11/2009 | Polachek | G06Q 30/02 |
| | | | 705/14.44 |
| 2010/0138451 A1* | 6/2010 | Henkin | G06Q 30/02 |
| | | | 707/803 |
| 2011/0213655 A1* | 9/2011 | Henkin | G06Q 30/00 |
| | | | 705/14.49 |
| 2012/0166532 A1 | 6/2012 | Juan et al. | |
| 2012/0331063 A1 | 12/2012 | Rajaram | |
| 2014/0156360 A1 | 6/2014 | Shalita et al. | |

* cited by examiner

AUTOMATIC PLACEMENT OF ELECTRONIC MEDIA CONTENT ITEMS WITHIN AN ONLINE DOCUMENT

BACKGROUND

This disclosure relates generally to providing electronic media content items to client devices and in particular to automatic placement of electronic media content items within online documents presented via client devices.

Online systems often present documents to clients. For example, an online system may present a news article, a science article, a document provided by another client and so on. Such online documents are viewed by clients on client devices, for example, a laptop or a mobile device. Clients typically scroll through an online document on a client device.

An online document may include text along with media objects, for example, images, and videos. Online systems often embed content items within an online document presented to a client, for example, images or videos. The client experience provided by an online document including embedded content items often depends on where the embedded content items are placed within the online document. For example, certain placements of the content items may distract the client from the content of the online document or from other content items placed within the online document.

Conventional techniques for presenting online documents with content items often embed the content items within the online document in a manner that provides poor client experience. Poor client experience leads to fewer client interactions with content items or the online document. Fewer client interactions may result in lower client membership of the online system. For example, where the online system is a social networking system, clients may be less likely to engage with their social networks if the content provided by the social networking system is not well presented or is difficult to follow.

SUMMARY

An online system stores online documents comprising blocks of text and media objects. The online system creates augmented online documents by combining the online documents with content items. The online system extracts features describing the layout of each augmented online document and generates a score based on the features. The online system selects an augmented online document based on the generated score and sends the selected augmented online document to a client device. Examples of online documents include news articles, science articles, documents provided by other clients, websites of corporations, etc. Examples of content items include images, text paragraphs, and video clips, and audio clips, hyperlinks, and online forms, etc.

In an embodiment, the online system uses a machine learning model for determining the layout of the augmented online document. The online system provides augmented online documents to clients and stores their interactions with the content items. The online system trains the machine learning model using the stored client interactions. The machine learning model is configured to determine the likelihood of a client interacting with the one or more content items. The online system uses the trained machine learning model to evaluate layouts of augmented online documents generated from online documents received subsequently.

In some embodiments, the online system generates the score for an augmented online document as a weighted aggregate value based on the features describing the augmented online document.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Environment

Figure 1:
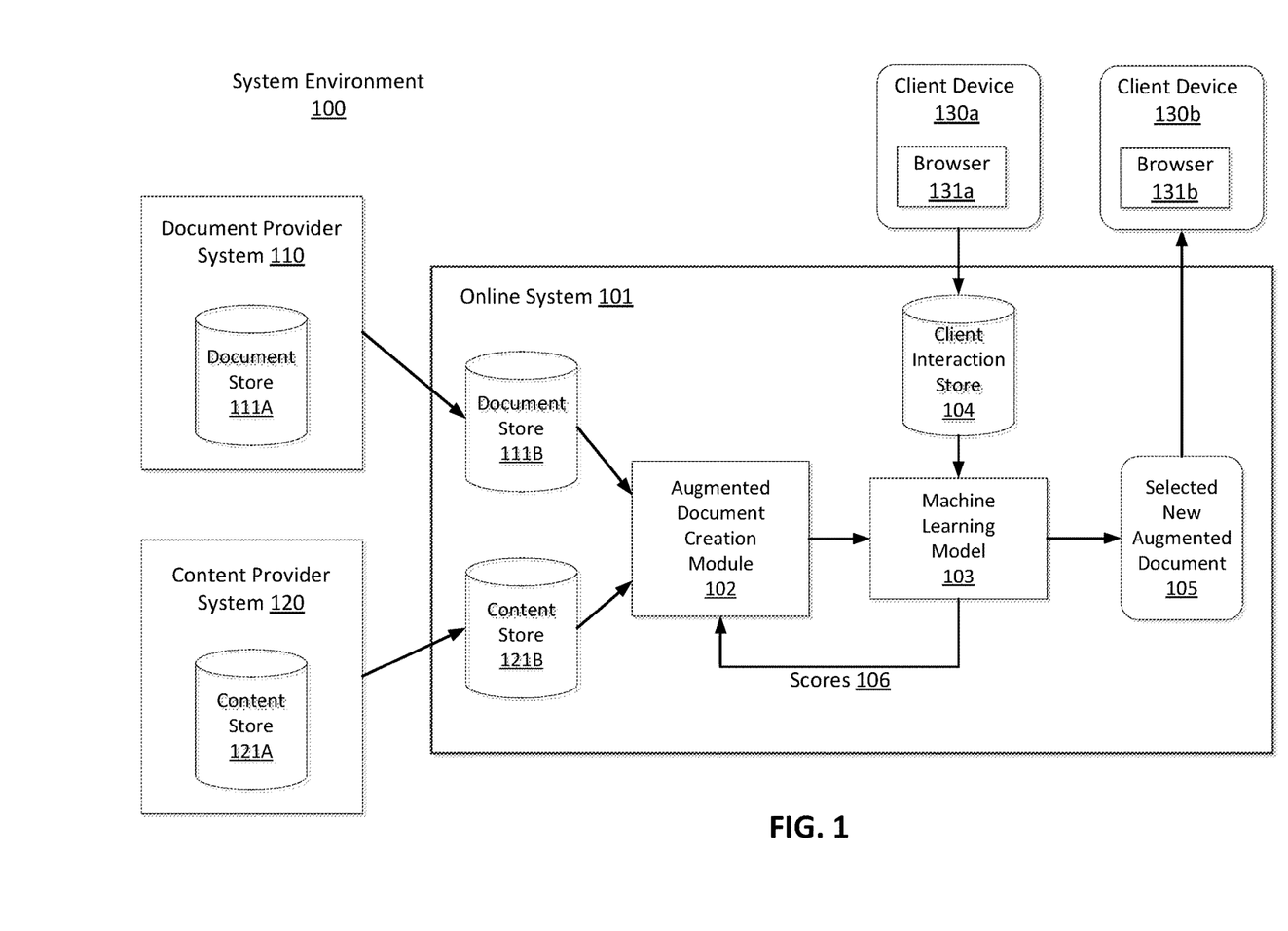
FIG. 1 is a block diagram of a system environment in which an online system operates, in accordance with an embodiment of the invention.

FIG. 1 is a block diagram of a system environment 100 in which an online system 101 operates, in accordance with an embodiment of the invention. The system environment shown in FIG. 1 comprises 1) a document provider system 110, 2) a content provider system 120, 3) the online system 101, and 4) client devices 130a and 130b. The term "document" refers to "online document" wherever it appears herein. The online system 101 receives online documents from the document provider system 110 and content items from the content provider system 120. The online system 101 combines online documents with content items into augmented online documents and presents these to client devices 130a and 130b. In one embodiment, the online system 101 is a social networking system.

FIG. 1 and the other figures use like reference numerals to identify like elements. A letter after a reference numeral, such as "130a," indicates that the text refers specifically to the element having that particular reference numeral. A reference numeral in the text without a following letter, such as "130," refers to any or all of the elements in the figures bearing that reference numeral, e.g., "130" in the text refers to reference numerals "130a" and/or "130b" in the figures.

The document provider system 110 shown in FIG. 1 provides online documents to the online system 101. The document provider system 110 may be a third-party publisher such as an online newspaper or the website of a university or corporation. In one embodiment, an online document is represented as a markup language document, such as a news article, a science article, a document provided by another client, or a website of a corporation. The document provider system 110 includes a document store 111A for storing online documents that may be sent to the online system.

The content provider system 120 shown in FIG. 1 sends content items to the online system 101 for combining with online documents. The content provider system 120 may be a provider of sponsored content such as a political campaign, a university, a corporation, the government, etc. Sponsored content comprises content items for which the content provider provides remuneration to the online system for distribution of the content items. Examples of sponsored content include online advertisements. The content provider system 120 includes a content store 121A for storing content items. In one embodiment, content items may be images, text paragraphs, video clips, audio clips, hyperlinks, online forms, etc. The content provider system 120 may additionally specify policies with each content item to the online system 101 regarding placement of the content item within an augmented online document. For example, a content provider system 120 may specify a policy that prohibits placement of the content item adjacent to an image or another content item within the online document.

The client devices 130a and 130b shown in FIG. 1 are used for interacting with the online system using a browser. The client devices 130a and 130b are one or more computing devices capable of receiving client input as well as transmitting and/or receiving data via a network. In one embodiment, a client device 130a is a conventional computer system, such as a desktop or laptop computer. Alternatively, a client device 130b may be a device having computer functionality, such as a personal digital assistant (PDA), a mobile telephone, a smartphone or another suitable device.

In one embodiment, a client device 130a executes an application allowing a client of the client device 130a to interact with the online system 101. For example, a client device 130a executes an application, for example, a browser 131a to enable interaction between the client device 130a and the online system 101 via a network. In another embodiment, a client device 130b interacts with the online system 101 through an application programming interface (API) running on a native operating system of the client device 130b, such as IOS® or ANDROID™. A client may download an augmented online document containing content items from online system 101 to client device 130b using browser 131b and interact with the content items by clicking on a link in a content item, filling in client information into an online form, closing the content item using a "close window" button on the client device, etc.

The online system 101 shown in FIG. 1 comprises a 1) document store 111B, 2) content store 121B, 3) augmented document creation module 102, 4) machine learning model 103, and 5) a client interaction store 104. The document store 111B stores online documents sent by the document provider system 110 to the online system 101 for combining with content items. The content store 121B stores content items and policies sent from the document provider system 110 to the online system 101 for combining with online documents.

The augmented document creation module 102 shown in FIG. 1 combines content items with online documents to create augmented online documents. An online document comprises blocks of data, wherein each block represents a portion of the document that is presented as contiguous data, for example, a paragraph of text, an image included in the online document, a video embedded within the online document, the title of the document, and so on. Each online document is presented using a layout of blocks and content items. The layout of an online document specifies the placement of blocks of the online document. The layout of an augmented online document further specifies the placement of the content items within an augmented online document. An augmented online document may be represented as an online document wherein content items are represented as blocks. In one example, each online document or augmented online document is a markup language document configured for display on the client device. The augmented document creation module 102 creates a plurality of augmented online documents having different layouts and sends them to the machine learning model 103 for scoring them. In an embodiment, the augmented document creation module 102 eliminates augmented online documents that violate one or more policies specified by the content provider system 120.

The machine learning model 103 shown in FIG. 1 receives as input, an augmented online document from the augmented document creation module 102. The machine learning model 103 is trained using historical data from a client interaction store 104 containing past client interactions with content items. In one example, the online system 101 receives client interactions from client devices 130 and stores them in the client interaction store 104. The machine learning model 103 receives new augmented online documents from the augmented document creation module 103 and scores them. The online system 101 selects a new augmented online document 105 based on the scores and sends it to a client device 130b for presentation.

In one embodiment, a greedy best fit augmented online document creation method is used that creates augmented online documents by placing one content item at a time in different positions within the online document, selecting the augmented online document having the highest score, and placing the next content item. In this embodiment, scores 106 from the machine learning model 103 are received by the augmented document creation module 102 to allow the augmented document creation module 102 to place a content item within the online document. This process is repeated until all content items have been placed.

Online Documents

Figure 2A:
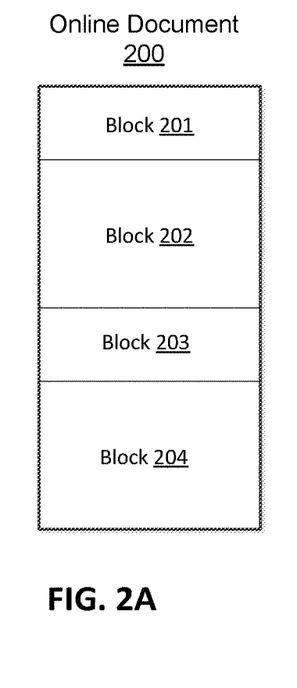
FIG. 2A is an illustration of a layout of an online document indicating positions of the blocks of the online document, in accordance with an embodiment of the invention.

FIG. 2A is an illustration of an online document 200 having four blocks, 201, 202, 203, and 204, and a layout that indicates positions of the four blocks, in accordance with an embodiment of the invention. Each block of online document 200 may be a text paragraph or a media object, such as an image, video clip, link, etc. Online document 200 has a layout represented as an ordered list of blocks indicating that if the online document is scanned from the beginning of the document to the end of the document, block 201 is encountered before block 202, which is encountered before block 203, which is encountered before block 204. When combining online document 200 with a content item, the content item may be placed between blocks of the layout of online document 200, or at the beginning or end of online document 200, e.g., a content item may appear before block 201, between block 201 and 202, or after block 204. In addition, each block may have attributes describing the block, for example, a size of the block, an attribute specifying the topic of the block of the online document 200, the author of the block, etc.

Figure 2B:
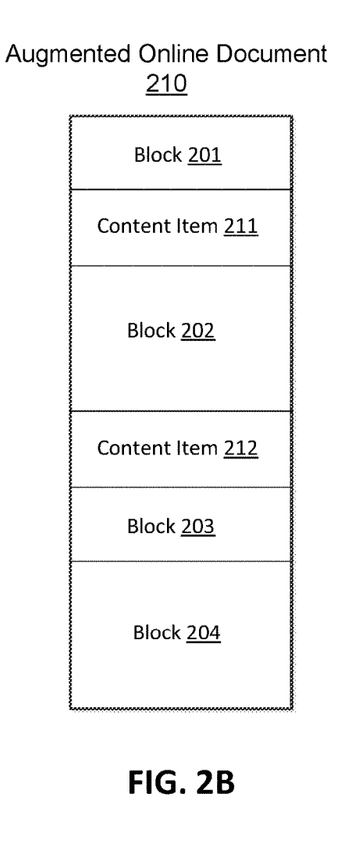
FIG. 2B is an illustration of a layout of an augmented online document indicating positions of the blocks of the online document and content items, in accordance with an embodiment of the invention.

FIG. 2B is an illustration of an augmented online document 210 created by combining online document 200 with two content items 211 and 212. Augmented online document 210 has four blocks 201, 202, 203, and 204, and two content items 211 and 212, and a layout that indicates positions of the blocks and content items as an ordered list, in accordance with an embodiment of the invention. In the layout of the augmented online document 210, content item 211 has been placed between blocks 201 and 202. In the layout of the augmented online document 210, content item 212 has been placed between blocks 202 and 203.

Figure 3A:
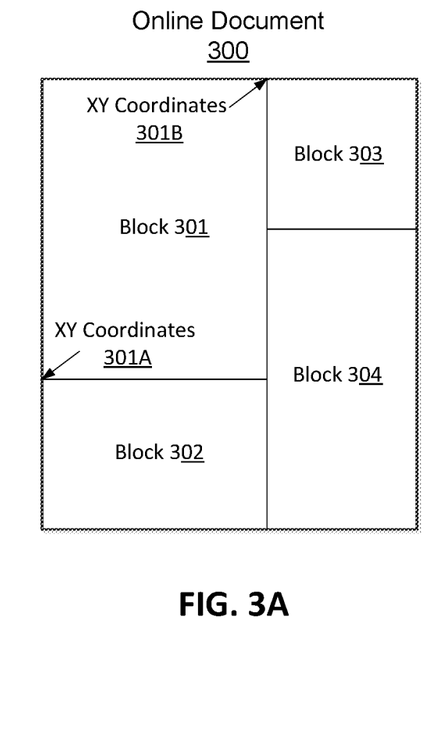
FIG. 3A is an illustration of a layout of an online document indicating positions of the blocks of the online document, in accordance with another embodiment of the invention.

FIG. 3A is an illustration of an online document 300 having four blocks, 301, 302, 303, and 304, and a layout that indicates positions of the four blocks, in accordance with an embodiment of the invention. Each block of online document 300 may be a text paragraph or a media object, such as an image, video clip, link, etc. Online document 300 has a layout represented as a pair of co-ordinates for each block, e.g., X and Y co-ordinates indicating the positions of opposite corners of the block, such that the length, width, and position of each block are defined. In one example, X and Y coordinates 301A and 301B represent the positions of two opposite corners of block 301. In addition, each block may have attributes specifying the topic of the block of the online document 300, the author of the block, etc.

Figure 3B:
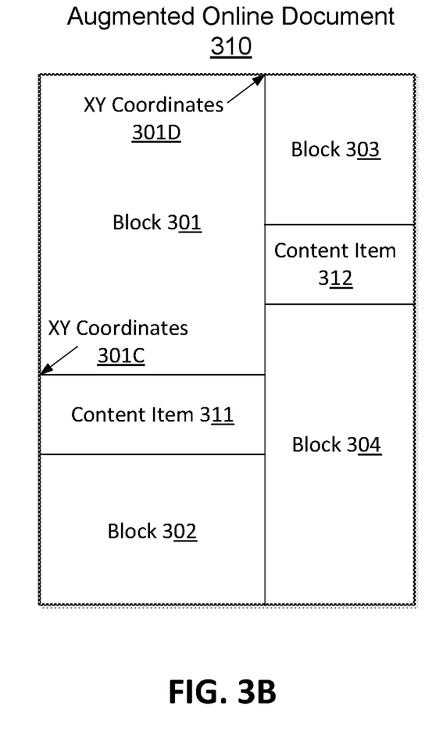
FIG. 3B is an illustration of a layout of an augmented online indicating positions of the blocks of the online document and content items, in accordance with another embodiment of the invention.

FIG. 3B is an illustration of an augmented online document 310 created by combining online document 300 with two content items 311 and 312. Augmented online document 310 has four blocks 301, 302, 303, and 304, and two content items 311 and 312, and a layout that indicates positions of the blocks and content items as coordinates, in accordance with an embodiment of the invention. In the layout of the augmented online document 310, content item 311 has been placed between blocks 301 and 302. In the layout of the augmented online document 310, content item 312 has been placed between blocks 303 and 304. The position of each content item may be specified using a pair of coordinates, for example, X and Y coordinates.

System Architecture

Figure 4:
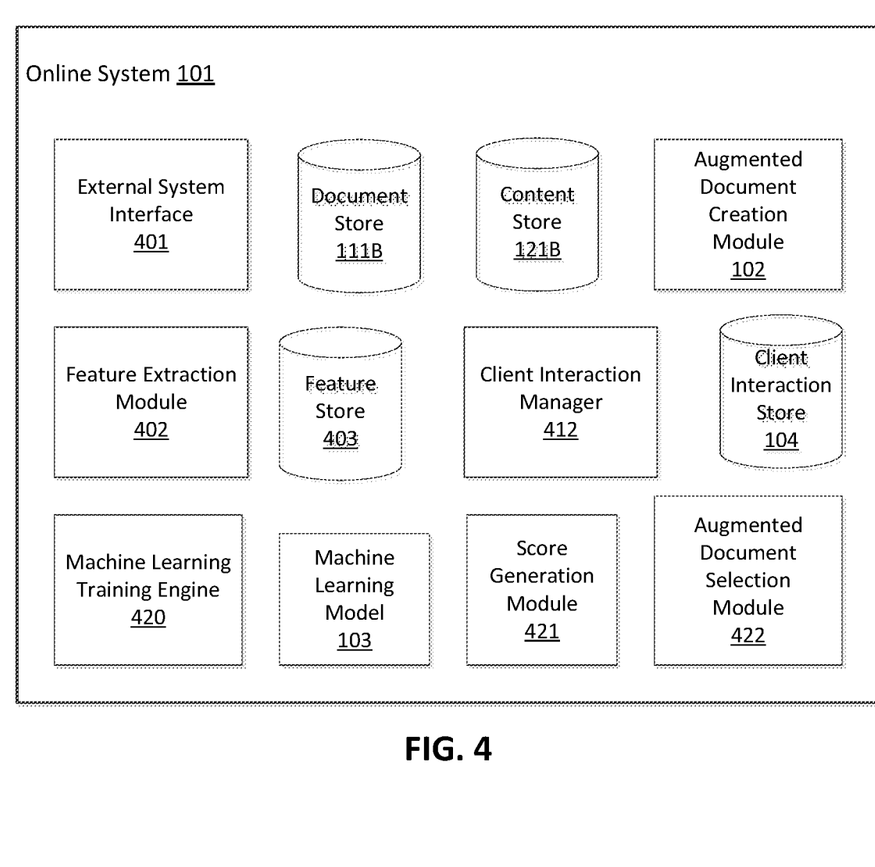
FIG. 4 is a block diagram of a system architecture of an online system, in accordance with an embodiment of the invention.

FIG. 4 is a block diagram of a system architecture of an online system 101, in accordance with an embodiment of the invention. The architecture of online system 101 comprises 1) an external system interface 401, 2) a document store 111B, 3) a content store 121B, 4) an augmented document creation module 102, 5) a feature extraction module 402, 6) a feature store 403, 7) a client interaction manager 412, 8) a client interaction store 104, 9) a machine learning training engine 420, 10) a machine learning model 103, 11) a score generation module 421, and 12) an augmented document selection module 422.

The external system interface 401 shown in FIG. 4 is a dedicated hardware networking device or software module that receives data packets representing online documents from the document provider system 110 and data packets representing content items from the content provider system 120. The external system interface 401 forwards data packets representing augmented online documents from the online system 101 via a network to client devices. The external system interface 401 also receives data packets representing client interactions with content items from client devices via the network. In one example, the external system interface 401 forwards data packets at high speed along the optical fiber lines of the Internet backbone. In another example, the external system interface 401 exchanges routing information using the Border Gateway Protocol (BGP) and may be an edge router, a border router, or a core router.

The document store 111B shown in FIG. 4 is used to store online documents received from the document provider system 110. In one embodiment in which the online system 101 is a social networking system, the online system 101 identifies online documents likely to be of interest to a client through a "newsfeed" presented to the client. A document presented to a client describes an action taken by an additional client connected to the client and identifies the additional client. In some embodiments, a document describing an action performed by a client may be accessible to clients not connected to the client that performed the action. A newsfeed manager may generate documents for presentation to a client based on information in the client interaction store 104 or may select candidate documents included in document store 111B. One or more of the candidate documents are selected and presented to a client by the newsfeed manager.

For example, the newsfeed manager receives a request to present one or more online documents to the online system 101 client. The newsfeed manager accesses one or more of a client profile store, the document store 111B, the client interaction store 104, and an edge store to retrieve information about the identified client. For example, online documents or other data associated with clients connected to the identified client are retrieved. The retrieved online documents or other data is analyzed by the newsfeed manager to identify content likely to be relevant to the identified client. For example, online documents associated with clients not connected to the identified client or online documents associated with clients, for which the identified client has less than a threshold affinity are discarded as candidate online documents. Based on various criteria, the newsfeed manager selects one or more of the candidate online documents for presentation to the identified client.

In various embodiments, the newsfeed manager presents online documents to a client through a newsfeed, which includes a plurality of online documents selected for presentation to the client. The newsfeed may include a limited number of online documents or may include a complete set of candidate online documents. The number of online documents included in a newsfeed may be determined in part by a client preference included in a client profile store. The newsfeed manager may also determine the order in which selected online documents are presented via the newsfeed. For example, the newsfeed manager determines that a client has a highest affinity for a specific client and increases the number of online documents in the newsfeed associated with the specific client or modifies the positions in the newsfeed where online documents associated with the specific client are presented.

The newsfeed manager may also account for actions by a client indicating a preference for types of online documents and selects online documents having the same, or similar, types for inclusion in the newsfeed. Additionally, the newsfeed manager may analyze online documents received by online system 101 from various clients and obtains information about client preferences or actions from the analyzed online documents. This information may be used to refine subsequent selection of online documents for newsfeeds presented to various clients.

The augmented document creation module 102 shown in FIG. 4 retrieves online documents from the document store 111B for processing. The document store 111B may be organized as a database, table, or file stored on one or more of removable or non-removable memory cards, tape cassettes, zip cassettes, and computer hard drives. In one embodiment, the document store 111B includes multiple data fields, each describing one or more attributes of the online documents. In one example, the document store 111B contains, for a single online document, the number of blocks in the online document, size of each block, whether the block is a text paragraph or a media object, the type of media object, the contents of each block, and the layout comprising positions of the blocks. In another example, the document store 111B contains coordinates for each block, indicating the layout of an online document.

The content store 121B shown in FIG. 4 is used to store content items received from the content provider system 120. The augmented document creation module 102 retrieves content items from the content store 121B for processing. The content provider system 120 may additionally specify policies with each content item to the online system 101 regarding placement of the content item within an augmented online document. A policy specifies constraints associated with placement of a block, for example, constraints that must be satisfied by a block and constraints that should not be satisfied by a block. In one example, the content provider system 120 may specify a policy that a content item of the content provider system 120 should not appear within a threshold distance of another content item provided by one or more specific content provider systems 120. For example, the content provider system 120 may specify a policy to the online system 101 that a content item representing an advertisement for a first brand of automobile should not appear in the layout of an augmented online document within a threshold distance from another content item representing an advertisement for a second brand of automobile competing with the first brand. A policy may specify the types of online documents in which a content item may be placed. The policy may specify a type of an online document based on the topics described in the online document. For example, a policy may specify a list of topics that are incompatible with the content item. Accordingly, the content item is not placed in online documents that describe those topics. The topics of an online system may be specified by the document provider system 110 or extracted by a topic extraction engine of the online system 101 as further described herein. As an example, the content provider system 120 may specify a policy to the online system 101 that a content item representing fast food may not appear in the middle of a layout of an augmented online document having the topic of healthful diets.

In one embodiment, the online system 101 includes a topic extraction engine, which identifies one or more topics associated with content items in the content store 121B. To identify topics associated with content items, the topic extraction engine identifies anchor terms included in a content item and determines a meaning of the anchor terms as further described in U.S. application Ser. No. 13/167,701, filed Jun. 24, 2011, which is hereby incorporated by reference in its entirety. For example, the topic extraction engine determines one or more topics associated with a content item maintained in the content store 121B. The one or more topics associated with a content item are stored in the content store 121B. Structured information associated with a content item may also be used to extract a topic associated with the content item.

The augmented document creation module 102 creates augmented online documents by combining an online document received from the document store 111B with one or more content items received from the content store 121B. Each augmented online document has a layout specified as positions of blocks of the online document and positions of the one or more content items.

Figure 7:
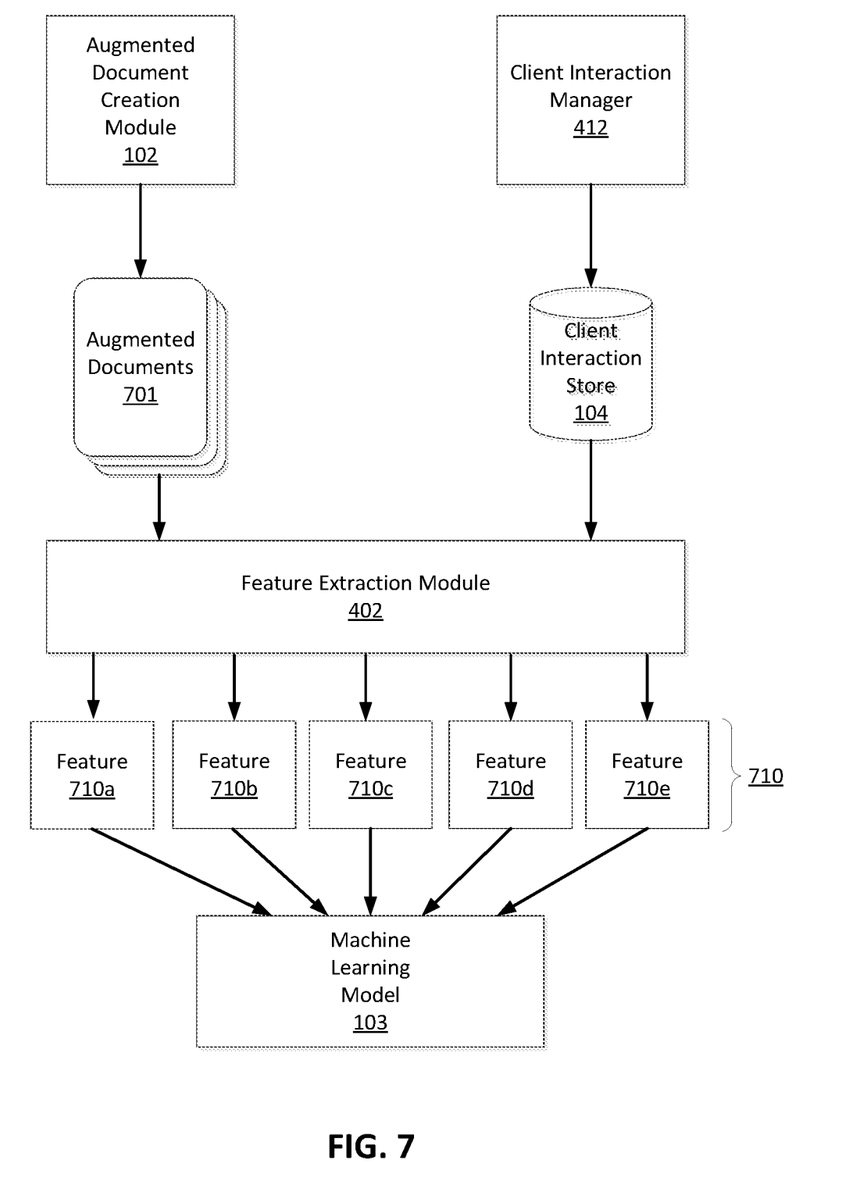
FIG. 7 is an illustration of a training procedure for a machine learning model, in accordance with an embodiment of the invention.

The feature extraction module 402 shown in FIG. 4 extracts a feature vector from each augmented online document describing the layout of each augmented online document and the policies specified by the content provider system 120 corresponding to content items. The features are required by a machine learning model 103. The feature vector comprises at least one feature describing a relative position of a content item in an augmented online document with respect to one or more other blocks of the augmented online document. Example features extracted by the feature extraction module are illustrated in FIG. 7. The feature store 403 is used to store features extracted from augmented online documents by the feature extraction module 402. The stored features are used for both training the machine learning model 103 as well as for selecting an augmented online document from a plurality of augmented online documents based on the features within the layout of the plurality of augmented online documents.

The client interaction manager 412 shown in FIG. 4 receives data packets representing client interactions with content items within augmented online documents from client devices via the external system interface 401, and populates a client interaction store 104 with information about client interactions. In addition, client interactions may involve features associated with particular augmented online document layouts and one or more particular clients. Such interactions are associated with the particular client IDs and stored in the client interaction store 104.

The client interaction store 104 shown in FIG. 4 may include client interactions, such as clicking on a link in a content item, filling in client information into an online form, closing the content item using a "close window" button on the client device, scrolling through the remainder of the online document after clicking on a content item link, sharing a content item by sending it to another client who is linked to the first client's online account, commenting on posts linked to a content item, checking-in to physical locations linked to a content item via a mobile device, joining an event linked to a content item to a calendar, joining a client group linked to a content item, expressing a preference for a content item, e.g., "liking" the content item, engaging in a transaction linked to a content item, etc. In one embodiment, data from the client interaction store 104 is used to infer interests or preferences of a client, augmenting the interests included in a profile of the client on the online system, and allowing a more complete understanding of client preferences for content items. In cases where the online system is a social networking system, a client of the system may interact with content items, and that interaction may be reported to connections of the client in the social networking system via a newsfeed or other mechanism for providing information to clients.

Clients and objects within the social networking system can be represented as nodes in a social graph that are connected by edges. The edges indicate the relationships between the clients, such as a connection within a social network, or the edges represent interactions by clients with objects in the social networking system, such as content items, online documents, stories, etc. In one embodiment, an edge may include various characteristics each representing characteristics of interactions between clients, interactions between clients and object, or interactions between objects. For example, characteristics included in an edge describe rate of interaction between two clients, how recently two clients have interacted with each other, the rate or amount of information retrieved by one client about an object, or the number and types of comments posted by a client about an object. The characteristics may also represent information describing a particular object or client. For example, a characteristic may represent the level of interest that a client has in a particular topic, the rate at which the client logs into the online system 101, or information describing demographic information about a client. Each characteristic may be associated with a source object or client, a target object or client, and a characteristic value. A characteristic may be specified as an expression based on values describing the source object or client, the target object or client, or interactions between the source object or client and target object or client; hence, an edge may be represented as one or more characteristic expressions.

The edge store also stores information about edges, such as affinity scores for objects, interests, and other clients. Affinity scores, or "affinities," may be computed by the online system 101 over time to approximate a client's affinity for an object, interest, and other clients in the online system 101 based on the actions performed by the client. A client's affinity may be computed by the online system 101 over time to approximate a client's affinity for an object, interest, and other clients in the online system 101 based on the actions performed by the client. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a client and a specific object may be stored as a single edge in the edge store, in one embodiment. Alternatively, each interaction between a client and a specific object is stored as a separate edge. In some embodiments, connections between clients may be stored in the client profile store, or the client profile store may access the edge store to determine connections between clients.

The machine learning training engine 420 shown in FIG. 4 trains the machine learning model 103 using the training data obtained from the client interaction store 104. The machine learning model 103 is configured to determine a score for an augmented online document. The score is indicative of a likelihood of a client interacting with the one or more content items within the augmented online document. The process executed by the machine learning training engine is illustrated in FIG. 7. In an embodiment, clients provide the training sets set by manually identifying layouts that represent high scores and layouts that represent low scores. In another embodiment, the machine learning training engine 420 extracts training sets from stored client interactions obtained from client interaction store 104. The stored client interactions represent client interactions that were performed by clients responsive to being presented with augmented online documents having specific layouts comprising different types of features. If a stored interaction indicates that a client interacted with the content items embedded in the augmented online document responsive to being presented with the augmented online document, the machine learning training engine 420 uses the augmented online document as a positive example of good layout. If a stored interaction indicates that a client did not interact with the content items embedded in the augmented online document responsive to being presented with the augmented online document, the machine learning training engine 420 uses the augmented online document as a negative example of poor layout.

The score generation module 421 shown in FIG. 4 generates a score for the layout of each augmented online document based on the features. In one embodiment, the score generation module 421 determines the score by evaluating an expression representing a weighted aggregate of scores associated with features. In an embodiment, the weight associated with a feature is predetermined, for example, configured by an expert client. Features that are most determinative of increased client interactions with the content items are weighted more. In another example, a feature (e.g., that a content item appears in a layout before any other block) is weighted less responsive to determining that the feature is associated with client interactions indicating clients stopped scrolling through an augmented online document responsive to interacting with a content item.

The augmented document selection module 422 shown in FIG. 4 selects a new augmented online document from the plurality of new augmented online documents based on the generated scores and sends the selected new augmented online document for presentation via the external system interface 401 to a client device. In one example, the augmented document selection module 422 selects the new augmented online document having the highest score from a plurality of new augmented online documents. In another example, the augmented document selection module 422 selects the new augmented online document violating the fewest number of policies of the content provider system 120.

Overall Process

Figure 5:
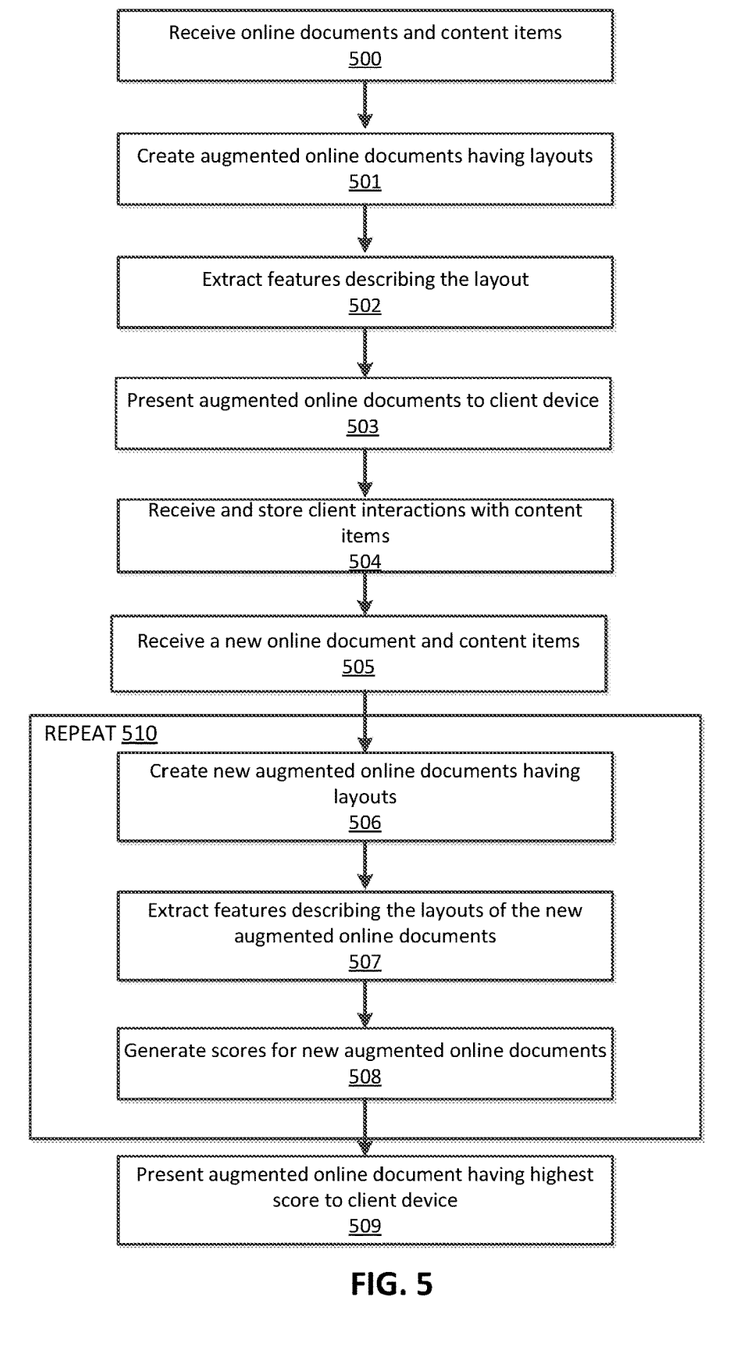
FIG. 5 illustrates the overall process of creating augmented online documents, in accordance with an embodiment of the invention.

FIG. 5 is a flowchart illustrating a method of creating augmented online documents, in accordance with an embodiment of the invention. For training the machine learning model, the online system 101 receives 500 online documents and content items from the document provider system 110 and the content provider system 120, and stores them in the document store 111B and content store 121B, respectively. The online system 101 creates 501 augmented online documents having layouts by combining the blocks of each online document with content items. The online system 101 extracts 502 features describing the layout of each augmented online document and the policies specified by the content provider system 120 using the feature extraction module 402. The online system 101 presents 503 augmented online documents to client devices 130a and 130b via the network using external system interface 401. The online system 101 receives and stores 504 client interactions with content items in the client interaction store 104 using the client interaction manager 412.

To process a new online document, the online system 101 receives 505 the new online document and new content items from the document provider system 110 and content provider system 120. The online system 101 creates 506 new augmented online documents having layouts by combining the blocks of the new online document with new content items. In one embodiment, the online system 101 uses an exhaustive search method that creates all possible layouts for new content items combined with the new online document. The online system 101 uses the exhaustive search method to determine a globally optimal solution. The online system 101 extracts 507 features describing the layouts of the new augmented online documents and the policies specified by the content provider system 120 corresponding to the new content items within the new augmented online documents. The online system 101 generates 508 scores for the plurality of new augmented online documents.

In one embodiment, a greedy best fit method is used to create new augmented online documents by placing 506 one content item at a time in different positions in intermediate layouts, extracting 507 features of the different intermediate layouts created and the policies specified by the content provider system 120, selecting 508 the intermediate new augmented document having the highest intermediate score, and placing the next content item 506. In this embodiment, steps 506, 507, and 508 repeat in a loop 510 until all content items have been placed. In another embodiment, a greedy first fit method is used to create a new augmented online document by placing 506 one content item at a time in an intermediate layout, extracting 507 features of the intermediate layout and the policies specified by the content provider system 120, selecting 508 the intermediate new augmented document if its score is above a certain threshold, and placing 506 the next content item. In this embodiment, steps 506, 507, and 508 repeat in a loop until all content items have been placed. The online system 101 present 509 the new augmented online document having the highest score to client devices 130a and 130b.

The flowchart in FIG. 5 illustrates a loop 510 that may be executed multiple times. Each iteration of the loop comprises execution of the steps 506, 507, and 508. The iterations of the loop 510 may be executed concurrently. For example, all iterations of the loop can be executed in parallel. Alternatively, some of the iterations may be executed in parallel and some iterations executed sequentially. Alternatively, iterations of the loop 510 may execute in a pipelined fashion such that execution of an iteration is started before the execution of a previous iteration is completed. In other embodiments, all iterations of the loop 510 are executed sequentially.

The process illustrated in FIG. 5 may perform an exhaustive search over all possible layouts to identify a global optimal layout. Accordingly, the loop 510 generates all possible layouts for the new online document and the input content items and selects the layout with the best score. In an embodiment, the process illustrated in FIG. 5 performs a greedy search. For example, the online system 100 generates a new layout by modifying a previously generated layout. The online system 100 selects the new layout if the new layout has a better score compared to previously generated layout and rejects the new layout if the new layout has a lower score compared to the previously generated layout. This process is repeated as long as layouts with better scores are obtained. In an embodiment, the online system executes the iterations of the loop 510 to determine new augmented online documents until it generates an augmented online document with a score better than a predetermined threshold score value.

In other embodiments, the online system uses a heuristic to examine a subset of all possible layouts and selects the layout with the best score within the subset. For example, the online system 101 may select a subset of possible locations between blocks of the online document where content items may be placed instead of all possible locations. The online system iterates through various combinations of augmented online documents that place content items at these locations and selects the layout with the best score.

Application of the Method

Figure 6A:
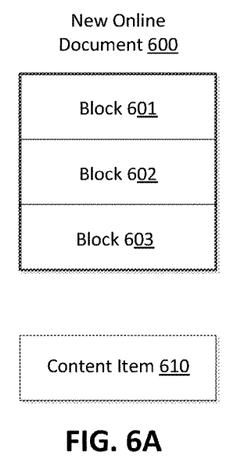
FIG. 6A is an illustration of an online document and a content item that are input to the online system, in accordance with an embodiment of the invention.
Figure 6B:
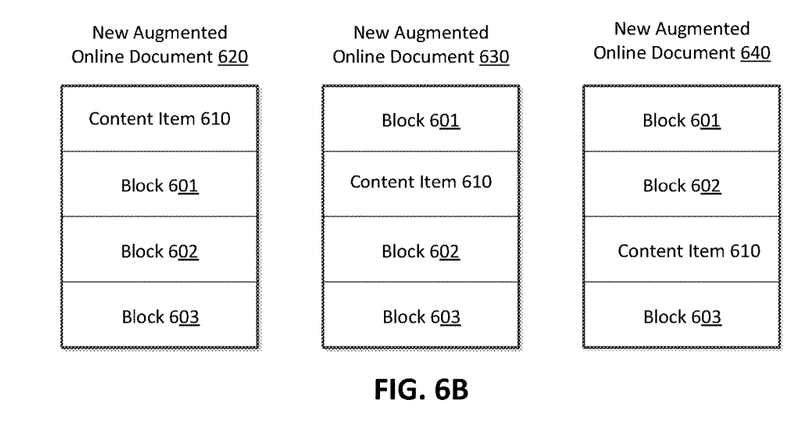
FIG. 6B is an illustration of several augmented documents including a content item that are produced by the online system, in accordance with an embodiment of the invention.

FIG. 6A is an illustration of a new online document 600 having three blocks 601, 602, and 603, and a new content item 610 that are input to the online system 101, in accordance with an embodiment of the invention. Block 601 may be an image. FIG. 6B is an illustration of three new augmented online documents 620, 630, and 640 created by the online system 101, in accordance with an embodiment of the invention. All three new augmented online documents 620, 630, and 640 have layouts combining the blocks of the new online document 600 with new content item 610. For example, in the new augmented online document 620, the new content item 610 has been placed before block 601.

Once the three new augmented online documents 620, 630, and 640 have been created, the online system 101 extracts features from the three new augmented online documents. In one example, a feature may represent whether a content item is placed before all other blocks in an online document. Layouts of augmented online documents containing this feature may lead to decreased client interactions with the content item therein. In new augmented online document 620, content item 610 is placed before all other blocks in the layout. Therefore, the score generated by the machine learning model 103 for new augmented online document 620 will be lower because the machine learning model is configured to determine a score indicative of a likelihood of a client interacting with the new content item 610 within new augmented online document 620.

Figure 6C:
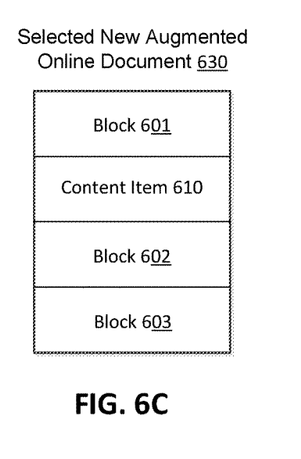
FIG. 6C is an illustration of an augmented online document selected by the online system, in accordance with an embodiment of the invention.

In another example, a feature may represent whether a content item is placed adjacent to an image block in an augmented online document. Layouts of augmented online documents containing this feature may lead to increased client interactions with the content item therein. In new augmented online document 630, new content item 610 is not placed before all other blocks but is placed adjacent to an image block 601. Therefore, the score generated by the machine learning model 103 for new augmented online document 630 will be higher. In new augmented online document 640, the new content item 610 is neither placed before all other blocks nor placed adjacent to image block 601. Therefore, the score generated by the machine learning model 103 for new augmented online document 640 will lie between the scores for new augmented online documents 620 and 630. FIG. 6C is an illustration of the new augmented online document 630 having the highest score selected by the online system 101 using the augmented document selection module 422 to be presented to the client.

Machine Learning Training Engine

FIG. 7 illustrates the training procedure executed by the machine learning training engine 420 for the machine learning model 103. The procedure comprises the use of the 1) augmented document creation module 102, 2) augmented online documents 701, 3) the client interaction manager 412, 4) client interaction store 104, 5) feature extraction module 402, 6) feature vector 710, and 7) a machine learning model 103. The augmented document creation module 102 shown in FIG. 7 receives online documents and content items and combines them to create augmented online documents 701 that are sent to the feature extraction module 402. The client interaction manager 412 presents the augmented online documents 701 used for training to clients via the external system interface 401. The client interaction manager 412 receives client interactions responsive to presenting the augmented online documents 701 from client device 130a via the external system interface 401. The client interaction store 104 receives client interactions with augmented online documents 701 from the client interaction manager 412 and stores them for training the machine learning model 103. In alternative embodiments, the machine learning training engine 420 analyzes the client interactions stored in the client interaction store 104 as examples of positive and negative training sets and provides the training sets to the machine learning model for training the model.

The feature extraction module 402 shown in FIG. 7 extracts a feature vector 710 from each augmented online document 701 describing the layout of the augmented online document 701 and the policies specified by the content provider system 120. The features corresponding to augmented online documents 701 presented to client devices 130a and 130b are used for training the machine learning model 103 based on client interactions with augmented online documents 701 whose layouts contain those features. The feature vector comprises at least one feature 710a describing a relative position of a content item with respect to one or more blocks in a layout of an augmented online document 701. A feature 710b may represent whether a content item is placed adjacent to a block representing a text paragraph in a layout of an augmented online document 701. A feature 710c may represent whether a content item is placed adjacent to a block representing an image in a layout of an augmented online document 701. A feature 710d may represent a number of words of text between two content items in a layout of an augmented online document 701. A feature 710e may represent whether a content item is placed before all other blocks in a layout of an augmented online document 701.

In one example, a feature may represent whether content items provided by competing content system providers or content items representing competing products are placed adjacent to each other. In this example, a content item representing an advertisement for a first brand of automobile may violate a policy of the content provider 120 if it is placed adjacent to another content item representing an advertisement for a second brand of automobile competing with the first brand. In another example, a feature may represent whether a content item representing a certain product is placed in an augmented online document 701 related to a conflicting topic. In this example, a content item representing an advertisement for fast food may violate a policy of the content provider 120 if the content item appears within a layout of an augmented online document 701 related to the topic of healthful diets.

The machine learning training engine 420 trains the machine learning model 103 shown in FIG. 7 using the stored client interactions 104 and the feature vector 710. The machine learning model 103 is thereby configured to determine a score for an augmented online document 701, the score indicative of a likelihood of a client interacting with the one or more content items within the augmented online document 701. The machine learning training engine 420 applies machine learning techniques to train the machine learning model 103 to receive an augmented online document as input and generate a score based on the layout of the augmented online document. The score generated by the machine learning model 103 is indicative of a likelihood of the client interacting with content items included within the online document. In an embodiment, the score is indicative of a predicted click-through rate of the content items, such as probabilities that the features have a particular Boolean property, or an estimated value of a scalar property. As part of the training of the machine learning model 103, the machine learning training engine forms a training set of features and client interactions by identifying a positive training set of features that have been determined to have the property in question (increased client interactions), and, in some embodiments, forms a negative training set of features that lack the property in question. In one embodiment, the machine learning training engine 420 applies dimensionality reduction (e.g., via linear discriminant analysis (LDA), principle component analysis (PCA), or the like) to reduce the amount of data in the feature vectors 710 to a smaller, more representative set of data.

The machine learning training engine 420 uses supervised machine learning to train the machine learning model 103 shown in FIG. 7, with the feature vectors 710 of the positive training set and the negative training set serving as the inputs. Different machine learning techniques-such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps-may be used in different embodiments. The machine learning model 103, when applied to the feature vector 710 extracted from a layout, outputs an indication of whether the layout has the property in question, such as a Boolean yes/no estimate, or a scalar value representing a probability.

In some embodiments, a validation set is formed of additional features, other than those in the training sets, which have already been determined to have or to lack the property in question. The machine learning training engine 420 applies the trained validation machine learning model 103 shown in FIG. 7 to the features of the validation set to quantify the accuracy of the machine learning model 103. Common metrics applied in accuracy measurement include: Precision=TP/(TP+FP) and Recall=TP/(TP+FN), where precision is how many the machine learning model 103 correctly predicted (TP or true positives) out of the total it predicted (TP+FP or false positives), and recall is how many the machine learning model 103 correctly predicted (TP) out of the total number of features that did have the property in question (TP+FN or false negatives). The F score (F-score=2×PR/(P+R)) unifies precision and recall into a single measure. In one embodiment, the machine learning training engine 420 iteratively retrains the machine learning model 103 until the occurrence of a stopping condition, such as the accuracy measurement indication that the model is sufficiently accurate, or a number of training rounds having taken place.

As part of the training of the machine learning model 103 shown in FIG. 7, the machine learning model 103 determines weights for each feature, such that the score for a layout of an augmented online document 701 is determined as a weighted aggregate of scores associated with features. Accordingly, the weight associated with a feature is determined based on stored client interactions 104 with content items responsive to presenting an augmented online document 701 whose layout includes the feature. Features that are most determinative of increased client interactions are weighted more. In one example, a feature representing whether a content item is placed before all other blocks, is weighted less responsive to determining that the feature is associated with a high rate of client interactions indicating clients stopped scrolling through the augmented online document 701 responsive to interacting with the content item.

Execution of the Machine Learning Model

Figure 8:
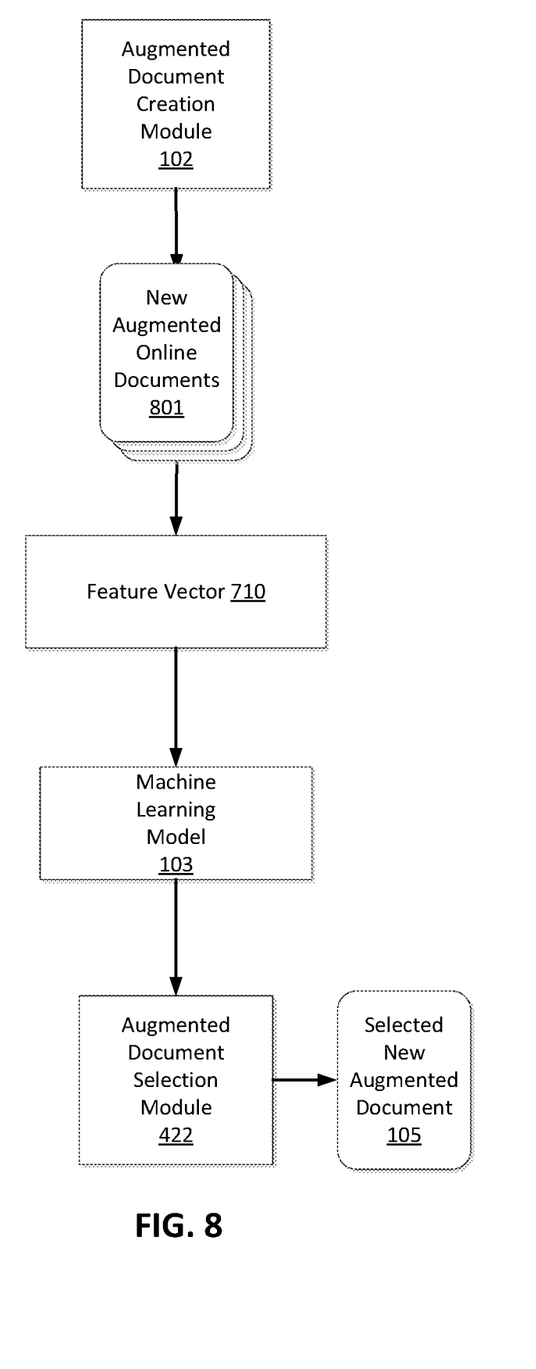
FIG. 8 is an illustration of the process for determining a layout of an augmented online document based on a machine learning model, in accordance with an embodiment of the invention.

FIG. 8 is an illustration of the process for determining a layout of an augmented online document based on a machine learning model, in accordance with an embodiment of the invention. The execution procedure creates an optimal layout for a new augmented online document from a new online document that is input to the online system 101. The procedure comprises the use of 1) the augmented document creation module 102, 2) new augmented online documents 801, 3) feature vector 710, 4) the machine learning model 103, 5) the score generation module 421, 6) the augmented document selection module 422, and 8) a selected new augmented online document 105. The augmented document creation module 102 shown in FIG. 8 creates a plurality of new augmented online documents 801 by combining the new online document with one or more new content items, such that each new augmented online document 801 has a layout. The feature extraction module extracts a feature vector 710 shown in FIG. 8, describing the layout of the new augmented online documents and the policies specified by the content provider system 120 corresponding to content items. The extracted features are sent to both the machine learning model 103 and the score generation module 421.

The machine learning model 103 is configured to optimize the conditional probability that a client will interact with a content item based on the content item's location in the new augmented online document 801. In one embodiment, P($locate_c$) represents the probability that a given content item c is located within the layout of a new augmented online document 801. In this embodiment, $P_u$(interact$_c$) represents the probability that a client u interacts with given content item c within the layout of a new augmented online document 801. The machine learning model 103 is configured to optimize the sum $\Sigma_u \Sigma_c P_u$(interact$_c$|locate$_c$), which represents the sum of conditional probabilities over all clients and all content items that a client u interacts with given content item c within the layout of a new augmented online document 801, given that content item c is located within the layout of a new augmented online document 801.

In another embodiment, there may be more than one type of client interaction that is optimized. In this embodiment, $P_u$(interact(t)$_c$) represents the probability that a client u interacts with given content item c in manner t. The machine learning model 103 is configured to optimize the sum $\Sigma_u \Sigma_c P_u$(interact(t)$_c$|locate$_c$), which represents the sum of conditional probabilities over all clients, all content items, and all types of client interactions that that a client u interacts in a manner t with given content item c within the layout of a new augmented online document 801, given that content item c is located within the layout of a new augmented online document 801.

In one example having two types of interactions ("click" and "purchase a product"), the machine learning model 103 is configured to optimize the sum $\Sigma_u \Sigma_c P_u$(purchase$_c$|click$_c$)×$P_u$(click$_c$|locate$_c$), where $P_u$(purchase$_c$) is the probability that client u will purchase the product represented by content item c, $P_u$(click$_c$) is the probability that client u will click on content item c, $P_u$(purchase$_c$|click$_c$) is the conditional probability that a client u will purchase the product represented by content item c given that client u clicks on content item c, and $P_u$(click$_c$|locate$_c$) is the is the conditional probability that a client u clicks on content item c given that content item c is located within the layout of a new augmented online document 801. In this example, the machine learning model 103 is configured to optimize the sum of conditional probabilities over all clients and all content items that a client u will purchase the product represented by content item c given that content item c is located within the layout of a new augmented online document 801.

The machine learning model 103, having been trained using similar feature sets, is applied to the feature vector 710. Classifications, binaries, or other scores, based on the feature vector 710, are determined by the machine learning model 103, according to some embodiments. In one embodiment, a machine learning model 103 determines a classification, binary, or score indicating the predicted client preference for every configurable or customizable attribute of the new augmented online document. The machine learning model 103 sends the score associated with each feature in each new augmented online document 801 to the augmented document selection module 422. The score associated with each feature indicates a likelihood of a client interacting with the one or more content items associated with that feature.

In another embodiment, the score generation module 421 receives the feature vector 710 based on the augmented online document 801. The score generation module 421 generates a score for the input augmented online document 810 as a weighted aggregate of scores based on the features. The weights of an expression representing the weighted aggregate are assigned such that an augmented online document is scored high if the layout of the augmented online document is likely to maximize client interactions with the content items. Accordingly, features that are most determinative of increased client interactions are weighted more. The score generation module 421 sends the score for the new augmented online document 801 to the augmented document selection module 422. The augmented document selection module 422 selects a new augmented online document 105 from the plurality of new augmented online documents based on the generated scores.

Conclusion

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

We claim:

1. A method, comprising:
   storing, by an online system, a plurality of online documents, each online document comprising one or more blocks;
   for each of the online documents:
      (i) creating a plurality of augmented online documents by combining the online document with one or more content items, at least a first layout of a first augmented online document being different than a second layout of a second augmented online document, wherein a layout defines relative positions of the one or more blocks and the one or more content items presented in an augmented online document; and
      (ii) storing data of client interactions with the one or more content items, responsive to presenting the augmented online documents to one or more clients, the stored data of client interactions comprising information describing client interactions associated with the first layout and client interactions associated with the second layout, wherein a client interaction is an action taken by one of the clients with a content item;
   accessing a machine learning model trained using the stored data of client interactions associated with different layouts created from the online document, the machine learning model configured to determine a score for an augmented online document having a particular layout, the score indicative of a likelihood of a client interacting with the one or more content items within the augmented online document;
   receiving a new online document comprising one or more new blocks;
   creating a plurality of new augmented online documents by combining the new online document with one or more new content items;
   for each of the plurality of new augmented online documents:
      (i) extracting a feature vector describing a layout of the new augmented online document, the feature vector comprising at least a feature describing a relative position of a new content item with respect to the one or more new blocks; and
      (ii) generating a score for the new augmented online document by the machine learning model based on the feature vector;
   selecting a new augmented online document from the plurality of new augmented online documents based on the generated scores; and
   sending the selected new augmented online document for presentation via a client device.

2. The method of claim 1, wherein the machine learning model corresponds to a specific client, and training the machine learning model uses the stored data of client interactions of the specific client responsive to presenting augmented online documents to the specific client.

3. The method of claim 1, wherein each new block represents one of a text paragraph or a media object of the new online document, and wherein a feature of the feature vector represents whether a new content item is placed adjacent to a new block representing a media object.

4. The method of claim 1, wherein a feature of the feature vector represents a number of words of text between two new content items.

5. The method of claim 1, wherein the score is determined as a weighted aggregate of scores associated with features, wherein a weight associated with a feature is determined based on the stored data of client interactions with content items responsive to presenting an augmented online document whose layout includes the feature.

6. The method of claim 5, wherein one of the features is weighted less responsive to determining that the one of the features is associated with a high rate of client interactions indicating clients stopped scrolling through an augmented online document having the one of the features.

7. The method of claim 1, wherein the first layout specifies an ordered list of the blocks.

8. The method of claim 1, wherein the relative positions of the one or more blocks and the one or more content items are specified by coordinates.

9. The method of claim 1, wherein creating the plurality of new augmented online documents comprises:
   for each of the one or more new content items, adding the new content item to a position in the layout of the new augmented online document, such that the score for the new augmented online document containing the new content item is maximized.

10. A method, comprising:
    receiving an online document comprising one or more blocks;
    creating a plurality of candidate augmented online documents by combining the online document with one or more content items, the candidate augmented online documents each having a layout that defines relative positions of the one or more blocks and the one or more content items, the plurality of candidate augmented online documents having different layouts;
    for each of the plurality of candidate augmented online documents, generating a score based on one or more features describing the layout of the candidate augmented online document, the score being generated based on stored data of client interactions with the one or more content items presented in different layouts, wherein a client interaction is an action taken by a client with a content item, generating the score comprises:
(i) extracting a feature vector describing a layout of the candidate augmented online document, the feature vector comprising at least a feature describing a relative position of the one or more content items with respect to the one or more new blocks; and
(ii) generating the score for the candidate augmented online document by a machine learning model based on the feature vector, the machine learning model trained based on historical client interactions with the one or more content items;
selecting one of the candidate augmented online documents from the plurality of candidate augmented online documents based on the generated scores; and
sending the selected candidate augmented online document for presentation via a client device.

11. The method of claim 10, wherein each block represents one of a text paragraph or a media object of the online document.

12. The method of claim 10, wherein generated the score is based on a feature that represents a number of words of text between two content items.

13. The method of claim 10, wherein the score is determined as a weighted aggregate of scores associated with features, wherein a weight associated with a feature is determined based on the stored data of client interactions with content items responsive to presenting an augmented online document whose layout includes the feature.

14. The method of claim 13, wherein one of the features is weighted less responsive to determining that the one of the features is associated with a high rate of client interactions indicating clients stopped scrolling through an augmented online document having the one of the features.

15. The method of claim 10, wherein the relative positions of the one or more blocks and the one or more content items are specified by coordinates.

16. A non-transitory computer readable storage medium configured to store program code, the program code comprising instructions that, when executed by a processor, cause the processor to:
store, by an online system, a plurality of online documents, each online document comprising one or more blocks;
for each of the online documents:
(i) create a plurality of augmented online documents by combining the online document with one or more content items, at least a first layout of a first augmented online document being different than a second layout of a second augmented online document, wherein a layout defines relative positions of the one or more blocks and the one or more content items presented in an augmented online document; and
(ii) store data of client interactions with the one or more content items, responsive to presenting the augmented online documents to one or more clients, the stored data of client interactions comprising information describing client interactions associated with the first layout and client interactions associated with the second layout, wherein a client interaction is an action taken by one of the clients with a content item;
access a machine learning model trained using the stored data of client interactions associated with different layouts created from the online document, the machine learning model configured to determine a score for an augmented online document having a particular layout, the score indicative of a likelihood of a client interacting with the one or more content items within the augmented online document;
receive a new online document comprising one or more new blocks;
create a plurality of new augmented online documents by combining the new online document with one or more new content items;
for each of the plurality of new augmented online documents:
(i) extract a feature vector describing a layout of the new augmented online document, the feature vector comprising at least a feature describing a relative position of a new content item with respect to the one or more new blocks; and
(ii) generate a score for the new augmented online document by the machine learning model based on the feature vector;
select a new augmented online document from the plurality of new augmented online documents based on the generated scores; and
send the selected new augmented online document for presentation via a client device.

17. The non-transitory computer readable storage medium of claim 16, wherein the machine learning model corresponds to a specific client, and training the machine learning model uses the stored data of client interactions of the specific client responsive to presenting augmented online documents to the specific client.

18. The non-transitory computer readable storage medium of claim 16, wherein a feature of the feature vector represents a number of words of text between two new content items.

19. The non-transitory computer readable storage medium of claim 16, wherein the one or more new content items are the same as the one or more content items.

* * * * *